United States Patent Office

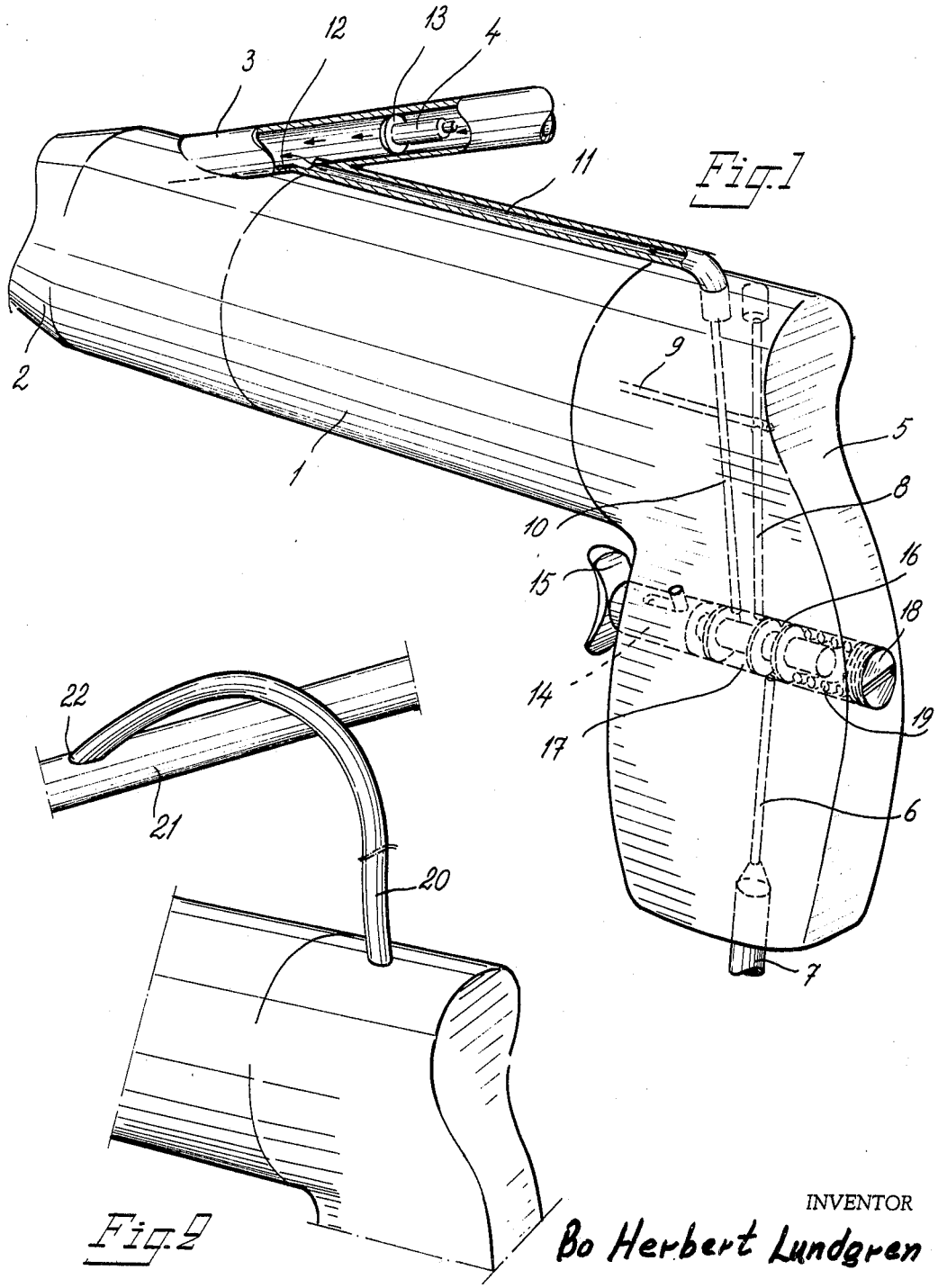

3,488,825
Patented Jan. 13, 1970

3,488,825
COMPRESSED-AIR GUNS OR SIMILAR TOOLS
Bo Herbert Lundgren, Tyreso, Sweden, assignor to Frank Dahlberg AB, Stockholm, Sweden
Filed May 18, 1967, Ser. No. 639,341
Claims priority, application Sweden, May 26, 1966, 7,234/66
Int. Cl. B23q 7/10
U.S. Cl. 29—212
3 Claims

ABSTRACT OF THE DISCLOSURE

An improvement for compressed-air guns and similar tools to effect delivery of uniformly aligned articles such as screws, rivets, cotter pins, tire studs etc. to a position of assembly. A feeder line passes from a supply of the said articles to the exit orifice of the compressed-air gun, and the return air conduit of the tool is connected between the supply and the exit orifice; whereby a vacuum is created in the feeder line, drawing articles in the supply rapidly into a receiving position in the tool.

---

The present invention pertains to an arrangement in compressed-air guns or similar tools, for delivering uniformly aligned articles, such as screws, rivets, cotter pins, tire studs etc. to the assembly position.

Compressed-air gun tools for driving tire studs into tires are known to the art, said tools presenting a drive bolt driven by a pneumatic piston-cylinder arrangement for ejecting the studs one at a time into holes previously formed in the thread of a tire. Prior art tools of this nature are provided with a line or hose into which a number of uniformly aligned tire studs are fed and return air, obtained in the piston-cylinder arrangement as the piston returns from a working stroke, is utilised to propell the studs from the rear of the stud feeder tube, forwards through said tube to a receiving position in the exit orifice of the gun; in which position the driving bolt by being displaced axially in a direction towards the discharge orifice of the tool during a working stroke of the piston-cylinder arrangement is able to engage a stud for the purpose of ejecting and driving the same into a work-piece. However, since recent efforts to impart a uniform alignment to the articles and to deliver the same, for instance, in rows to a supply or storage position, by means of fully automatic auxiliary appliances have been successful it has become inconvenient and structurally difficult to utilise said return air for advancing the articles in the feeder tube to the receiving position in the muzzle opening of the gun. Apart from the fact that when driving the articles forward in this manner according to known methods the effect has not always been the highest possible it is a desire to be able to collect in an almost continuous sequence one article at a time, and rapidly and effectively advance said article into the muzzle of the gun.

This desideratum is realised in a very simple but particularly effective manner by means of the invention, which is substantially characterised in that a feeder tube passing from a supply or batch of said articles is led to the discharge orifice of the gun; the return-air conduit of the tool opening out in said feeder tube, in a direction towards the muzzle end of the gun, at a point situated between the batch of articles and said muzzle.

The invention will now be described more clearly with reference to a number of embodiments thereof, diagramatically shown on the accompanying drawing; further characterising features of the invention being disclosed in conjunction therewith.

FIG. 1 shows in perspective and partly in section a portion of a hand gun according to the invention.

FIG. 2 shows a smaller portion of a somewhat modified embodiment of the hand gun according to FIG. 1. The reference numeral 1 in the drawing indicates generally the body of a compressed-air tool, substantially of the type disclosed in the introduction hereto. The muzzle portion or discharge portion 2 of the gun is partly cut away in FIG. 1; a line, e.g. a hose or the like 3, however, passing obliquely into the body proper, in the proximity of this portion of the pistol, and serving as a feeder channel or line for, e.g. uniformly aligned tire studs 4. The line or hose 3 may be connected to a magazine, store or the like (not shown) located at some relatively considerable distance from the compressed-air tool itself. Such a magazine or store may, for instance, comprise articles 4, previously arranged one above the other therein or may also comprise means for automatically turning said articles into the correct position or alignment, and for delivering one article at a time to a fetching station, in front of which the rear end of the feeder line is situated.

Attached to the rear end of the body 1 is a piston or the like 5 through-passed by a compressed-air channel 6, which is supplied, via an external line 7, from a convenient source of compressed air. The channel is provided with an extension 8, connected to a central compressed-air feeding line 9 which serves the non-shown mechanism of the pistol tool direct. The reference numeral 10 indicates a return-air line which is provided with an extension 11 in the form of a hose or a tube, but which may also comprise a channel in the tool proper. The said line 11 opens out in the feeder line 3 directed towards the muzzle orifice of the compressed-air tool. In that the return air flows, through the line 11, into the thus directed feeder line 3, the rapidly moving stream of air in the feeder line in a direction towards the muzzle orifice of the tool, creates a strong vacuum in the feeder line 3, in front of the studs 4 located in the store or magazine, causing said studs to be rapidly drawn forward and, subsequent to passing the point 12 at which the channel 11 opens out, are forced into a receiving position in the tool. Naturally, in order to obtain the best effect it is expedient to adjust the internal dimensions of the channel 3 to conform to the head 13 of the article 4, in such a way that whilst a relatively tight seal is obtained the article is still capable of sliding freely along the passage.

Further, a slide valve 14 is arranged to control or regulate the compressed-air line 6, 8 or the return line 10, 11, the said valve being operated by a trigger 15. The slide ventil which operates in a boring 16 in the piston portion 5 proper presents a communication portion 17 whereby the line 8 communicates with the line 10 or 11, i.e. when the valve is located in the shown position the return air from the line 9 passes through the line 8, the slide-valve space 17, the line 10, the channel 11 and out into the feeder line 3. The compressed-air line 6 is thus blocked. When pressing in the slide valve 14 by means of the trigger 15 the compressed-air line 6 is opened at the same time as channel 10 is blocked. Accordingly, the space 17 forms a communicating passage between the channels 6 and 8. When the tool has in this way obtained the amount of air necessary for its function the slide valve 14 is returned to the position shown in the drawing and the channel 6 is blocked and channel 10 opened, the amount of air entrapped in the tool, that is the aforementioned return air, passes through the channels 9, 8, 10, 11 in accordance with the above. It may also be mentioned that the boring 16 is closed by means of a screw seal 18 which may also form a reaction support for a spring 19. It is often an advantage if the channel 11 can be formed integrally with the body of the tool proper. Thus the said channel 11 may be a through-boring in the body proper. According to another alternative the channel 11 may comprise a tube secured to the body 1, preferably in close proximity to the same. It is also of considerable importance that said channel 11 opens out substantially at the point where the feeder line proper passes into the tool, whereby the vacuum is effective from the supply or magazine for the articles 4 and substantially up to the muzzle orifice of the tool.

However, in certain applications it has been desirable to isolate said member 11 from the body of the tool 1, for instance, so that the channel 11 can be given a substantial length. In FIG. 2 is shown a channel 20 in the form of a hose, which is intended to serve in the same way as the channel 11 shown in FIG. 1. The said channel 20 also opens out into the feeder line 21, which is intended to correspond with the feeder line 3 in FIG. 1, but at a point 22 which may be located at a considerable distance from the tool muzzle orifice proper. The arrangement shown in FIG. 2 functions substantially in the same way as that shown in FIG. 1.

The invention is not restricted to the shown and described embodiments but the same may be varied arbitrarily within the scope of the following claims.

What is claimed is:

1. An arrangement in compressed-air guns or the like for delivering uniformly lined articles (4) such as screws, rivets, cotter pins, tire studs etc., into an assembly position, characterized in that a feeder line (3, 21) passes from a supply or batch of said articles to the muzzle orifice of the gun, the return-air conduit (10, 11, 20) of the tool opening out in said feeder line in a direction towards the muzzle orifice at a point (12, 22) situated between the supply and the said muzzle orifice.

2. An arrangement as claimed in claim 1, characterised in that the return-air line is substantially integral with the tool body, and opens out in the feeder line substantially at the point (12) where the latter passes into the tool body (1).

3. An arrangement as claimed in any of the claims 1–2, characterised in that the return-air line (10, 11, 20) is capable of being closed by means of a valve (14) which also controls the supply of air to the mechanism of the tool.

References Cited

UNITED STATES PATENTS

| | | | |
|---|---|---|---|
| 1,980,967 | 11/1934 | DeMooy | 227—112 |
| 2,732,554 | 1/1956 | Knott | 227—112 |
| 3,367,015 | 2/1968 | Brosene | 29—212 |

THOMAS H. EAGER, Primary Examiner

U.S. Cl. X.R.

227—112